Sept. 22, 1931.  B. A. O'NEILL  1,824,681
MACHINE FOR CUTTING COFFEE AND THE LIKE
Filed July 10, 1930   4 Sheets-Sheet 1
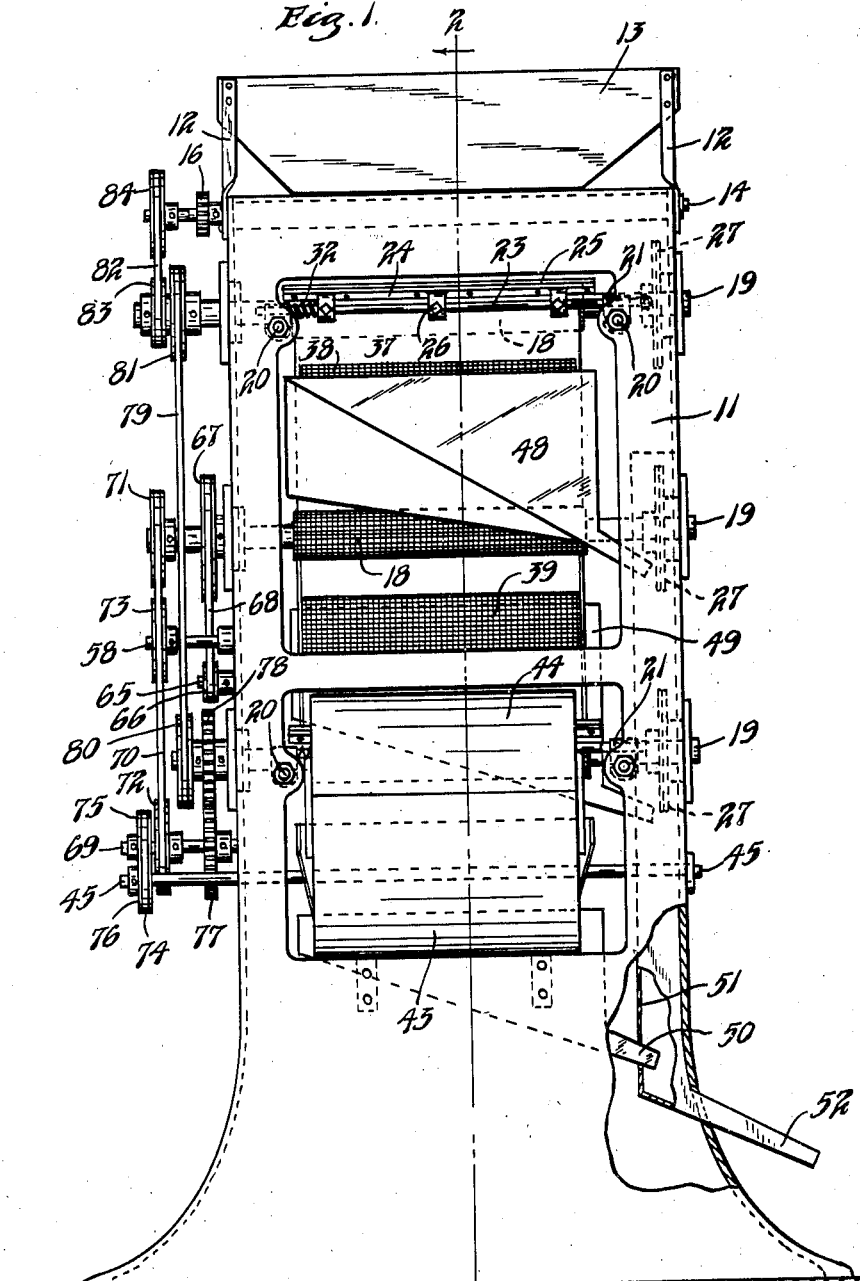
INVENTOR.
BENJAMIN A. O'NEILL.
BY HIS ATTORNEYS.
Williamson & Williamson

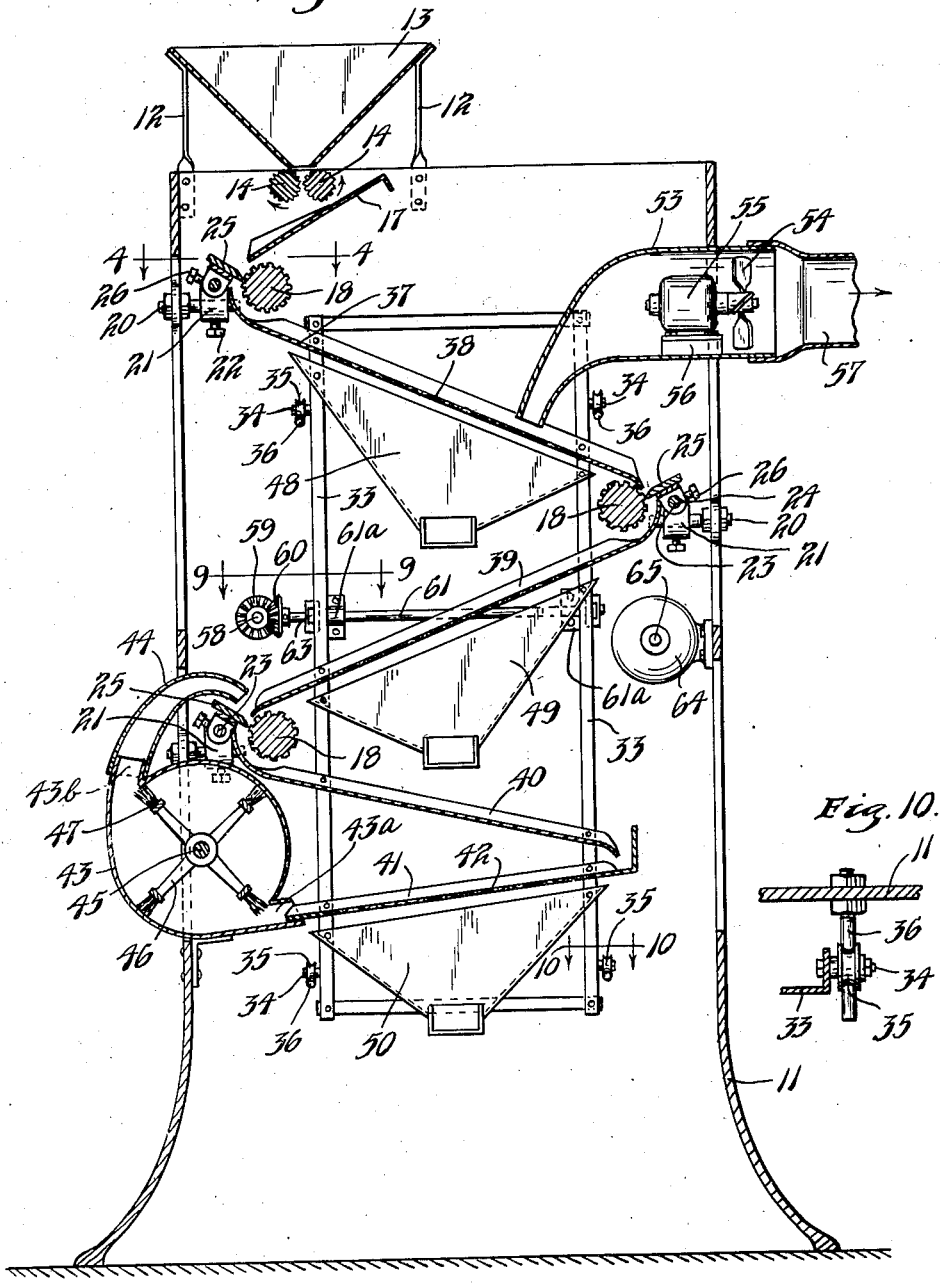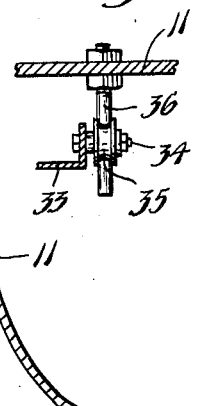

Sept. 22, 1931.    B. A. O'NEILL    1,824,681
MACHINE FOR CUTTING COFFEE AND THE LIKE
Filed July 10, 1930    4 Sheets-Sheet 3
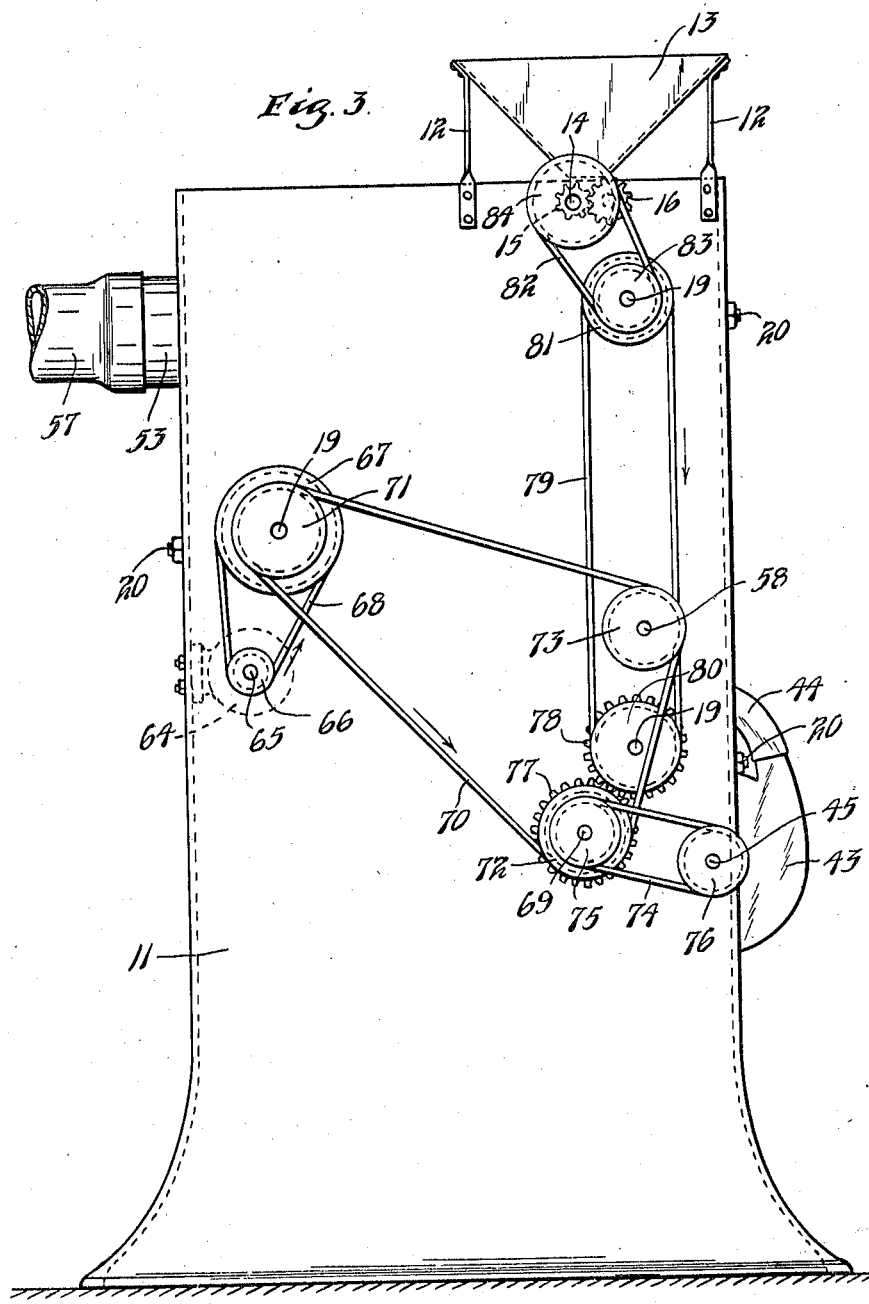
INVENTOR.
BENJAMIN A. O'NEILL
BY HIS ATTORNEYS.
Williamson & Williamson

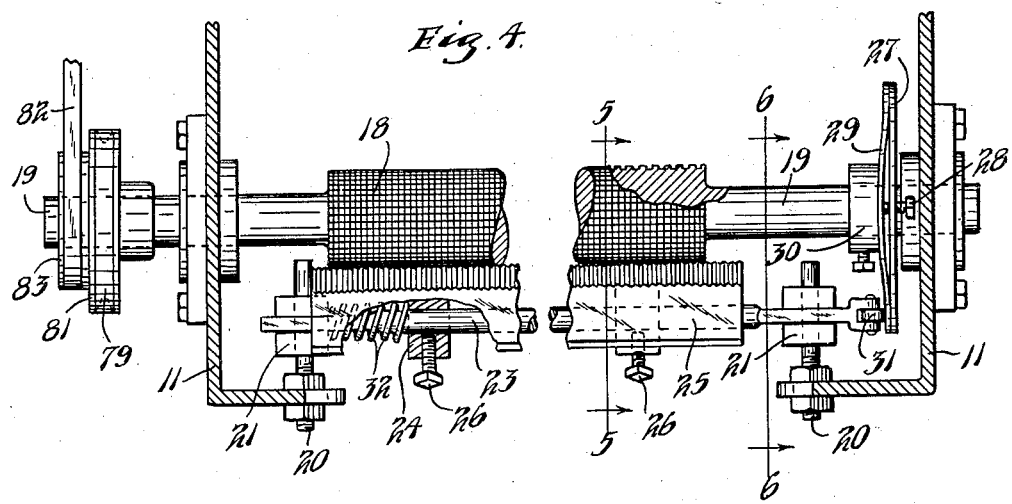
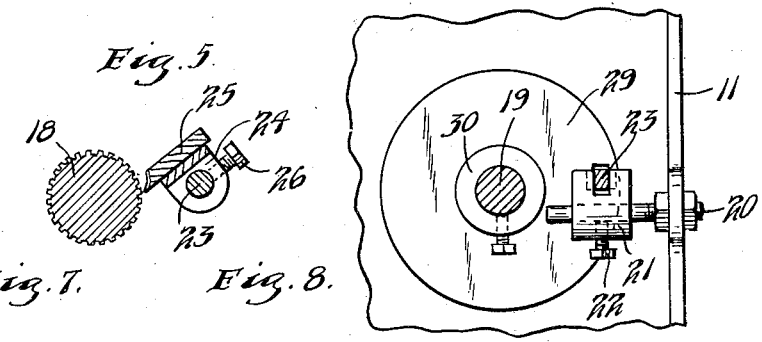
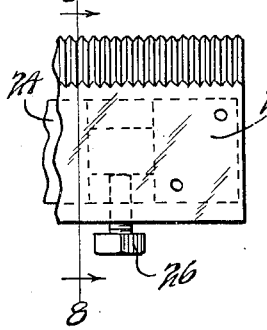
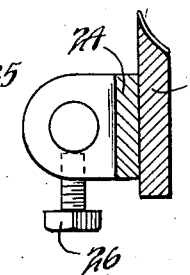
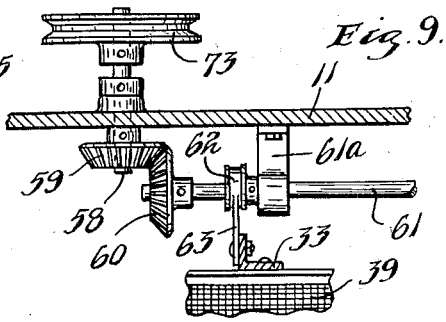
INVENTOR.
BENJAMIN A. O'NEILL.
BY HIS ATTORNEYS Patented Sept. 22, 1931

1,824,681

UNITED STATES PATENT OFFICE

BENJAMIN A. O'NEILL, OF MINNEAPOLIS, MINNESOTA, ASSIGNOR TO SCHUTZ-O'NEILL CO., OF MINNEAPOLIS, MINNESOTA, A CORPORATION OF MINNESOTA

MACHINE FOR CUTTING COFFEE AND THE LIKE

Application filed July 10, 1930. Serial No. 466,911.

This invention relates to processes and machines for sub-dividing coffee beans and the like into small particles.

It is the object of this invention to provide novel processes and novel machines for effectively dividing coffee beans and the like into small homogenous particles.

To these ends the invention consists in the novel processes and the novel combination of parts, hereinafter defined in the claims and described in the following specification, made in connection with the accompanying drawings, wherein like reference characters refer to the same or similar parts throughout the various views, and, in which, Fig. 1 is a view in front elevation of a coffee machine or mill embodying the invention and adapted to carry out the processes thereof;

Fig. 2 is a vertical section taken on the line 2—2 of Fig. 1, as indicated by the arrows;

Fig. 3 is a view in left side elevation of the mill shown in Fig. 1;

Fig. 4 is a horizontal section taken substantially on the line 4—4 of Fig. 2, as indicated by the arrows;

Fig. 5 is a vertical section taken on the line 5—5 of Fig. 4, as indicated by the arrows;

Fig. 6 is a vertical section taken on the line 6—6 of Fig. 4 as indicated by the arrows;

Fig. 7 is a plan view showing a portion of one of the blades used;

Fig. 8 is a section taken on the line 8—8 of Fig. 7, as indicated by the arrows;

Fig. 9 is a horizontal section taken on the line 9—9 of Fig. 2 as indicated by the arrows; and Fig. 10 is a horizontal section taken on the line 10—10 of Fig. 2 as indicated by the arrows.

Although the processes of the present invention may be carried out by use of machines or mechanism of other types than the machine illustrated, the machine shown is particularly well adapted for carrying out the processes of the invention and the processes may be described in connection with the description of the machine shown.

Referring to the drawings, in order that the various parts of the machine may be readily assembled together and that the movable parts of the machine may be largely shielded to prevent operators from becoming entangled with the same, a rectangular casing 11 is provided preferably having an outwardly flaring base portion to stably support the same. The front of the casing 11 may be arbitrarily taken to be the portion of the casing illustrated in Fig. 1 and this front and the back may be provided with large apertures to permit of access by an operator to the inner parts of the machine. Mounted adjacent the front of the casing 11 at the top of the sides of the casing are pairs of upwardly projecting straps 12, which support a hopper 13, which feeds to a pair of oppositely disposed and oppositely rotating corrugated cracker rollers 14 journaled in the sides of the casing 11. The two rollers 14 are adapted to be driven at different speeds as by means of two intermeshing gears 15 and 16 secured respectively to the outer ends of the two roller shafts adjacent one side of the casing 11, the gear 15 being shown as of smaller diameter than the gear 16. An inclined deck 17 is disposed below the rollers 14 and this deck is secured to the two sides of the casing 11 and has side wings adjacent its lower forward end which taper inwardly to reduce the width of the lower forward edge of the deck. An upper roller 18 having a roller shaft 19 journaled in the sides of the casing 11, is disposed below the lower forward edge of the deck 17 and this roller has a plurality of longitudinal and circumferential grooves cut in the surface thereof to form projecting teeth on the roller. A pair of pins 20 are secured to the front of the casing 11 and these pins project toward the roller 18 and have mounted thereon a pair of guides 21 provided with transversely extending grooves in their upper surfaces as best illustrated in Fig. 4. The guides 21 are slidable to and from the roller 18 on the pins 20 and they may be held in any desired adjusted position by means of set screws 22. A horizontally disposed shaft 23 has squared portions adjacent its two ends which fit within the grooves of the guide 21 for sliding movement therein and this shaft runs through a pair of downwardly projecting ears on a bar 24 to which a blade 25 is secured. As the bar 24 may be rotated relative to the shaft 23, the blade 25 may be set at any desired angular adjustment relative to the horizontal plane in which the central axis of the roller 18 is found. Set screws 26, fitting within the ears of bar 24, may be tightened against the shaft 23 to hold the blade 25 in a desired angular position. The blade 25 as best illustrated in Figs. 4, 5, 7 and 8, is provided with a concavely bevelled lower edge having triangular grooves cut therein to form teeth and a serrated sharpened cutting edge. Mounted on the lower shaft 14 adjacent the right side of the casing 11, is a disk 27 carrying one or more set screws 28 which bear against a cam disk 29 disposed between a collar 30 on the shaft 14 and the disk 27. The cam disk 28 is composed of spring material and the set screws 28 will bulge the outer portions of the disk outwardly from the disk 27 to form cam surfaces. The shaft 23 at its right end is provided with a forked portion carrying a roller 31 which rides on the inner side of the cam disk 29 adjacent its edge. A coiled spring 32 surrounding the shaft 23 reacts between the left guide 21 and the left lug on the bar 24 to, at all times, exert its tension to slide the shaft 23 and the parts carried thereby to the right side of the casing 11 and to maintain the roller 31 at all times in engagement with the cam disk 29. A shaker cage 33 is disposed centrally in the casing 11 and carries at each side thereof forwardly and rearwardly projecting pins 34 on which are mounted grooved rollers 35 which ride on pins 36 projecting inwardly from the two sides of the casing 11. An inclined upper deck 37 is secured to the cage 33 at its sides and this deck has a curved upwardly extending lip at its upper end which fits below the lower edge of the roller 18 and blade 25 above described. The deck 37 has side flanges and has a large aperture in its central portion within which a screen 38 is held. The deck projects downwardly and rearwardly and at its lower edge it is provided with a downwardly curved lip which projects over an intermediate corrugated roller 18 having a roller shaft 19 journaled in the sides of the casing 11 adjacent the back thereof. The intermediate roller 18 is similar in all respects to the upper roller 18 above described with the exception that the intermediate roller will preferably be provided with finer teeth than the upper roller 18. A blade 25 for cooperation with the intermediate roller 18 is mounted in a manner similar to the blade 25 for use with the upper roller 18 and is adapted to be actuated by mechanism similar to the actuating mechanism for the upper blade 25. The intermediate blade 25 will preferably be provided with finer teeth than the upper blade 25 for cooperation with the finer teeth on intermediate roller 18.

An intermediate screened deck 39 similar in all respects to the upper deck 37, has a curved upper lip fitting below the intermediate roller 18 and the intermediate blade 25 and this deck is secured to the sides of the cage 33 and runs downwardly and forwardly to project over a lower toothed roller 18 having a roller shaft 19 journaled in the sides of the casing 11 directly below the roller shaft 19 of the upper roller 18. The teeth in the roller 18 will preferably be finer than the teeth of the upper roller 18 and similar to the teeth on the intermediate roller 18. A lower blade 25 mounted and operated in the same manner as the upper blade 25 cooperates with the lower roller 18 but the teeth on this blade will preferably be finer than the teeth of the upper blade 25 and similar to the teeth on the intermediate blade 25. A deck 40 has an upwardly curved lip which fits below the lower roller blade 18 and the lower blade 25 and this deck 40 is of solid construction and is secured to the sides of the cage 33 and runs downwardly and rearwardly to discharge on to a deck 41 secured to the sides of the cage 33 and inclining downwardly and forwardly. The lower edge of the deck 40 is provided with a down turned lip while the deck 41 is provided at its upper edge with a vertical flange rearwardly from the lower edge of the deck 40. Both decks 40 and 41 are provided with side flanges and the deck 41 has a large aperture therein to receive a screen 42. A hollow cylinder 43 is mounted on the front of the casing 11 and projects partly forwardly therefrom, the forward portion of the deck 41 being tapered slightly to fit within a large inlet port 43a at the lower rear portion of the cylinder. The cylinder 43 has at its upper forward portion a tangential outlet port 43b to which a curved discharge nozzle 44 is connected, the said discharge nozzle extending to a point over the lower blade 25 adjacent the lower edge of the intermediate deck 39. A shaft 45 extends centrally through the cylinder 43 and is journaled in the sides of the casing 11. The shaft 45 carries spiders 46 adjacent but inwardly disposed from the ends of the cylinder 43 and bristle brushes 47 extend transversely between the ends of the arms of the spiders.

Mounted below the screened decks 37, 39 and 41 and secured to the cage 33, are three open topped receivers 48, 49 and 50 respectively. These receivers each have spouts at their right central portions which fit within openings in a vertical chute 51 secured to the right side of the casing 11 and having a discharge spout 52 which projects outwardly through the side of the casing 11 adjacent the lower end thereof. The various receivers 48, 49 and 50 have surfaces inclined towards their spouts so that finely divided coffee or the like running through the various screens of the screened decks will be carried directly to the spouts of the receivers. Above the upper deck 37 and secured to the back of the casing 11 is a hood 53 having a wide mouth portion which projects across the screen 38 and in this hood there is mounted a fan 54 illustrated in the drawings as being driven by means of an electric motor 55 bolted to a block 56 secured to the hood. It will, of course, be understood that the fan 54 may be driven in any desired manner. A discharge tube 57 runs outwardly from the rear end of the hood 53 and this tube may be carried to any desired position where chaff or the like from the coffee may be collected.

A stub shaft 58, best illustrated in Figs. 1, 2 and 9, is journaled in the left side of the casing 11 and it carries at its inner end a bevelled gear 59 meshing with a second bevelled gear 60 secured to a shaft 61 journaled in brackets 61a carried by the left side of the casing 11 and projecting inwardly therefrom. A grooved eccentric 62 is fixed to the shaft 61 and a pitman 63 has a circular portion at one end which fits within the groove of the eccentric 62 and the other end of the pitman is pivoted to the shaker cage 33.

Although the movable parts of the present machine may be driven in various manners, in the embodiment shown, a single electric motor 64 illustrated in dotted lines Fig. 3, is shown and this motor will drive all movable parts of the machine with the exception of the fan 54. The motor 64 is secured to the back of the casing 11 adjacent the left side thereof and the motor shaft 65 runs through the left side of the casing and carries at its end a small pulley 66. The motor shaft is adapted to rotate in the direction indicated by the arrow Fig. 3. The shafts for the corrugated rollers 14, the roller shafts 19, the shaft 45 and the shaft 58 all project outwardly beyond the left side of the casing 11 to receive pulleys. The shaft 19 for the intermediate roller 18 carries a large pulley 67 and an endless belt 68 runs over the pulley 66 and the pulley 67. A short shaft 69 is journaled in the left side of the casing 11 adjacent the forward side thereof below the lower roller shaft 19 and a belt 70 runs over pulleys 71, 72 and 73 secured respectively to the intermediate roller shaft 19, the shaft 69 and the shaft 58. Another endless belt 74 runs over pulleys 75 and 76 secured to the two shafts 69 and 45 respectively. A pinion 77 carried on shaft 69 meshes with and drives a gear 78 carried by the lower roller shaft 19. An endless belt 79 runs over pulleys 80 and 81 carried by the lower roller shaft 19 and the upper roller shaft 19 respectively. Another endless belt 82 runs over pulleys 83 and 84 secured respectively to the upper roller shaft 19 and to the shaft for the corrugated roller 14 carrying the gear 50. The various pulleys all have V-grooves therein and the belts 68, 70, 74, 79 and 82 will preferably all be V-belts. The direction of travel of the various belts is indicated by the arrows in Fig. 3.

When the motor 64 and the motor 55 are set in operation, the various movable parts of the machine will be driven for use in dividing coffee beans or the like into small cut particles. The two corrugated cracking rollers 14 will be rotated towards each other and the various tooth rollers 18 will be rotated toward the blades 25 cooperating therewith. The blades 25 will be reciprocated back and forth adjacent the respective rollers 18 due to the action of the cam plates 29 and the springs 32 on the shafts 23. The length of movement of the various shafts 23 may be adjusted by adjustment of the set screws 28 in the disks 27. The spacing of the blades 25 relative to the rollers 18 may be adjusted by moving the guides 21 inwardly or outwardly on the pins 20 and securing the guides in the desired position by means of the set screws 22. The angular tilt of the blades 25 relative to horizontal planes running through the axes of the rollers 18, may be adjusted by swinging the bars 24 on the shafts 23 and fixing the bars in the desired position by means of the set screws 26. A shaking movement will be imparted to the shaker cage 33 and the various parts carried thereby by reason of the rotation of the eccentric 62 and the motion imparted therefrom to the cage by the pitman 63. The cage 33 will, accordingly, move back and forth for a short distance between the sides of the casing 11, the grooved rollers 35 running on the pins 36. The shaft 45 will be rotated in a clockwise direction as viewed in Fig. 2 to rotate the brushes 47 rapidly. The fan 54 will create a strong draft of air outwardly through the hood 53 from the top side of the screened deck 37.

When coffee is to be ground by the machine, the coffee beans will be poured into the hopper 13 and will run downwardly between the corrugated cracking rollers 14. As these two rollers rotate at different speeds, the beans will be thoroughly cracked by the same and the coffee will then run downwardly on to the deck 17 where it will be discharged to the upper toothed roller 18 and the upper blade 25. The large particles of coffee will be caught by the upper portions of the teeth of the upper blade 25 and will be cut between the upper portions of the teeth of the blade and the teeth of the roller. Smaller particles of the coffee and particles previously cut between the upper portions of the teeth of the blade 25 and the roller 18 will be carried downwardly between the lower portions of the teeth of the blade 25 and the teeth of the roller and these smaller portions will be even more finely divided. The concave curve of the cutting edge of the blade 25 working in conjunction with the teeth of the roller, will produce a very efficient cutting action on the coffee so that large pieces of the coffee will be cut several times before being eventualy discharged between the roller and blade to the upper screened deck 37. As the blade 25 reciprocates back and forth adjacent the roller 18 along a line parallel to the axis of the roller, and as the roller is continuously rotated, a diagonal or shearing cutting action will be produced on the coffee and the coffee instead of being crushed, will be cut. The coffee discharged from between the upper roller 18 and the blade 25 will run downwardly on the screened deck 37 and the shaking action of the deck will assist in producing a down travel of the coffee on the deck. The smaller particles of coffee will, of course, fall through the screen 38 into the receiver 48 where they will be discharged into the chute 51 and carried off therefrom through the nozzle 52 where they may be collected. Larger particles of coffee not running through the screen 38 will be carried downwardly to the intermediate roller and intermediate blade 25 where they will be cut into finer particles and then be discharged on to the screened deck 39. The fine particles of coffee passing over the deck 39 will run through the screen of the deck 39 into the receiver 49 and be carried off to the chute 51. Any particles of coffee not carried through the screen of the deck 39 will be discharged from the deck to the lower roller 18 and its cooperating blade 25 and there subjected to a third cutting action. The coffee will then run downwardly over the solid deck 40 on to the screen deck 41 where the fine particles of coffee will be screened out to discharge into the receiver 50 and thence into the chute 51. If any large particles of coffee remain on the deck 41 after the coffee is carried over the screen 42, these particles will be discharged from the deck 41 through the inlet port 43a into the cylinder 43. The brushes 47, due to their rapid rotation, will strike these particles and carry them upwardly and discharge the same through the outlet port 43b into the nozzle 44 to be discharged from the nozzle 44 over the lower blade 25 at a point between the lower blade and the lower roller 18. These large particles will then be subjected to another action of the lower roller and blade. As the coffee runs down the upper deck 37, the chaff and light dust from the coffee will be carried off through the hood 53 by the fan 54. The teeth of the intermediate and lower rollers 18 and of the intermediate and lower blades 25 will preferably be made slightly finer than the teeth of the upper roller 18 and its cooperating blade 25, for the reason that particles of coffee after having passed between the upper roller 18 and the upper blade 25, will be more finely divided than when the coffee is discharged from the deck 17 to the upper roller 18 and its cooperating blade. The coffee will be evenly cut and homogenous particles of coffee will be discharged from the spout 52.

It will be seen that the coffee from the time it is fed to the machine will be successively acted on until all the coffee is cut to a uniform size. There will be no necessity to gather the tailings from the machine and feed the same back to the hopper.

The construction of the machine is quite simple and the coffee can be run through the machine very quickly. The machine, of course, will be used for other purposes than cutting coffee. It is found to be equally effective for cutting certain types of grain and other substances. The essential step in my process for subdividing coffee or the like into small particles is the subjecting of coffee or the like to a cutting action taking place simultaneously in two planes at right angles to each other. The particular rollers 18 and the cooperating blades 25 may be of practically any desired type and the reciprocal movement can be imparted to the blades in any desired manner. The screens for the decks 37, 39 and 41 will preferably be removable so that when desired, coffee or the like of different size may be cut by substituting screens of different mesh in the decks.

The present processes and machines have been amply demonstrated in actual practice and have been found to be successful for the purposes intended. The driving mechanism for the various movable parts can be considerably altered without departure from the scope of the invention.

It will be understood that various changes may be made in the form, details, arrangement and proportions of the various parts without departing from the scope of the present invention.

What is claimed is:—

1. In a machine for cutting coffee beans or the like into small particles, a rotatable cylinder provided with numerous projections on its curved face disposed in spaced relation and arranged in rows extending longitudinally and circumferentially of the cylinder, a reciprocal knife support, a knife mounted on said support for reciprocation therewith relative to the cylinder, said knife being disposed adjacent to said cylinder and having a toothed edge for cooperation with said projections to effect cutting of coffee beans or the like delivered between the cylinder and the knife, said knife being disposed at a downward inclination toward said cylinder and being mounted on its support for angular adjustment relative thereto and relative to the cylinder, and means for securing said knife on said support in different positions of angular adjustment relative thereto.

2. In a machine for cutting coffee beans or the like into small particles, a rotatable cylinder provided with numerous projections on its curved face disposed in spaced relation and arranged in rows extending longitudinally and circumferentially of the cylinder, a knife disposed adjacent to said cylinder and having a toothed edge for cooperation with said projections to effect cutting of coffee beans or the like delivered between the cylinder and the knife, said knife being disposed at a downward inclination toward said cylinder substantially radially with respect thereto and having a curved surface extending upwardly and outwardly from the toothed edge thereof, transversely extending cutting teeth on said surface, said knife being mounted for angular adjustments relative to the cylinder, means for securing the knife in different positions of angular adjustment thereof, and means for reciprocating the knife mounting means in any angular position of adjustment of the knife.

3. In a machine for cutting coffee beans or the like into small particles, a rotatable cylinder provided with numerous projections on its curved face disposed in spaced relation and arranged in rows extending longitudinally and circumferentially of the cylinder, a knife disposed adjacent to said cylinder and having a toothed edge for cooperation with said projections to effect cutting of coffee beans or the like delivered between the cylinder and the knife, said knife being disposed at a downward inclination toward said cylinder substantially radially with respect thereto and having a curved surface extending upwardly and outwardly from the toothed edge thereof, transversely extending cutting teeth on said surface, a shaft on which said knife is mounted for rotative adjustment to vary its angularity relative to the cylinder, means for securing the knife upon said shaft in a desired position of angular adjustment, and means for reciprocating said shaft.

4. In a machine for cutting coffee beans and the like into small particles, a rotatable cylinder provided with numerous cutting projections on its curved surface, a knife disposed adjacent to said cylinder at a downward inclination relative thereto and provided with teeth for cooperation with the projections on said cylinder to effect cutting of coffee beans or the like delivered between the cylinder and the knife, said knife being mounted for angular adjustments to vary its inclination relative to the cylinder, means for securing the knife in different positions of angular adjustment thereof, and means for reciprocating the knife mounting means in any angular position of adjustment of the knife.

In testimony whereof I affix my signature.

BENJAMIN A. O'NEILL.